United States Patent
Mogaki

(10) Patent No.: US 9,350,724 B2
(45) Date of Patent: May 24, 2016

(54) AUTHENTICATION SERVER SYSTEM FOR PERFORMING CONTROL OF NOTIFICATIONS DURING SERVICE USE, CONTROL METHOD, AND STORAGE MEDIUM

(71) Applicant: CANON KABUSHIKI KAISHA, Tokyo (JP)

(72) Inventor: Shunsuke Mogaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 14/516,209

(22) Filed: Oct. 16, 2014

(65) Prior Publication Data

US 2015/0113596 A1   Apr. 23, 2015

(30) Foreign Application Priority Data

Oct. 17, 2013  (JP) ................................ 2013-216482

(51) Int. Cl.
  *H04L 29/06*  (2006.01)
(52) U.S. Cl.
  CPC ............ *H04L 63/0815* (2013.01); *H04L 63/08* (2013.01); *H04L 2463/082* (2013.01)
(58) Field of Classification Search
  CPC ......... H04L 63/08; H04L 63/10; H04L 63/20; H04L 29/06; H04L 63/0428
  See application file for complete search history.

(56) References Cited

U.S. PATENT DOCUMENTS

| | | | | |
|---|---|---|---|---|
| 2006/0117104 A1* | 6/2006 | Taniguchi | ........... | H04L 63/0272 709/225 |
| 2007/0044146 A1* | 2/2007 | Murase | ................... | G06F 21/33 726/10 |
| 2008/0022356 A1* | 1/2008 | Tanaka | .................. | H04L 9/0891 726/1 |
| 2011/0252132 A1* | 10/2011 | Wetzer | .................... | G06F 9/542 709/224 |
| 2013/0117835 A1* | 5/2013 | Oguma | ................... | G06F 21/41 726/8 |

FOREIGN PATENT DOCUMENTS

JP    2003-256382 A    9/2003

* cited by examiner

*Primary Examiner* — Andrew Nalven
*Assistant Examiner* — Huan V Doan
(74) *Attorney, Agent, or Firm* — Canon U.S.A., Inc. IP Division

(57) ABSTRACT

When authentication processing is performed without requesting a user to input authentication information and receiving the authentication information in response to authentication processing performed in another authentication server system having successfully been performed, a notification is not issued to a terminal to be operated by the user.

13 Claims, 25 Drawing Sheets

FIG. 7

ACCOUNT TABLE 700

| USER ID /701 | TENANT ID /702 | NOTIFICATION REVISION /703 |
|---|---|---|
| uid0000001 | 900AA | 0 |
| uid0000002 | 900AA | 1 |
| uid0000003 | 901AA | 3 |
| uid0000004 | 901AA | 1 |
| uid0000005 | 1001AA | 2 |
| uid0000006 | 1002AA | 1 |
| ... | ... | ... |

FIG. 8

NOTIFICATION INFORMATION TABLE 800

| NOTIFICATION ID 801 | REVISION 802 | PUBLICATION START DATE 803 | PUBLICATION END DATE 804 | NOTIFICATION CONTENT 805 |
|---|---|---|---|---|
| 1 | 1 | 2013/10/01 | 2013/10/15 | xxx |
| 2 | – | 2013/10/15 | 2013/10/22 | xxx |
| 3 | 2 | 2013/10/5 | 2013/10/12 | yyy |
| 4 | 3 | 2013/10/10 | 2013/10/22 | yyy |
| 5 | – | 2013/10/12 | 2013/10/20 | yyy |
| ... | ... | ... | ... | ... |

FIG. 12

NOTIFICATION INFORMATION TABLE

| NOTIFICATION ID (801) | REVISION (802) | SERVICE (1201) | PUBLICATION START DATE (803) | PUBLICATION END DATE (804) |
|---|---|---|---|---|
| 1 | 1 | SERVICE L | 2013/10/01 | 2013/10/15 |
| 2 | - | SERVICE M | 2013/10/15 | 2013/10/22 |
| 3 | 2 | SERVICE L | 2013/10/5 | 2013/10/12 |
| 4 | 3 | SERVICE N | 2013/10/10 | 2013/10/22 |
| ... | ... | ... | ... | ... |

SALES TENANT TABLE 1300

| TENANT ID 1301 | TENANT NAME 1302 | NOTIFICATION DISPLAY 1303 |
|---|---|---|
| 900AA | SALES COMPANY A | DISPLAY |
| 901AA | SALES COMPANY B | NOT DISPLAY |
| ... | ... | ... |

CUSTOMER TENANT TABLE 1310

| TENANT ID 1311 | TENANT NAME 1312 |
|---|---|
| 1001AA | ABC Company |
| 1002AA | ABC Japan |
| ... | ... |

FIG. 14

SERVICE TABLE 1400

| SERVICE NAME 1401 | LICENSE ID 1402 |
|---|---|
| SERVICE L | 1 |
| SERVICE M | 2 |
| SERVICE N | 3 |
| ... | ... |

LICENSE TABLE 1410

| TENANT ID 1411 | LICENSE ID 1412 | SALES TENANT ID 1413 |
|---|---|---|
| 1001AA | 1 | 900AA |
| 1001AA | 3 | 900AA |
| 1002AA | 1 | 900AA |
| 1002AA | 2 | 901AA |
| ... | 3 | 901AA |
| ... | ... | ... |

SALES RIGHT TABLE 1420

| TENANT ID 1421 | LICENSE ID 1422 |
|---|---|
| 900AA | 1 |
| 900AA | 3 |
| 901AA | 1 |
| 901AA | 2 |
| ... | 3 |
| ... | ... |

FIG. 16

| TENANT ID | TENANT NAME | NOTIFICATION DISPLAY |
|---|---|---|
| 1001AA | ABC Company | DISPLAY |
| 1002AA | ABC Japan | NOT DISPLAY |
| ... | ... | ... |

CUSTOMER TENANT TABLE (1600)
Columns: 1311, 1312, 1601

| | | | |
|---|---|---|---|
| SALES TENANT TABLE | | | |
| 1301 | 1302 | 1801 | 1802 |
| TENANT ID | TENANT NAME | DISPLAY NOTIFICATION TO ADMINISTRATOR | DISPLAY NOTIFICATION TO GENERAL PERSON |
| 900AA | SALES COMPANY A | DISPLAY | NOT DISPLAY |
| 901AA | SALES COMPANY B | DISPLAY | DISPLAY |
| ... | ... | ... | ... |

1810

| | | | |
|---|---|---|---|
| CUSTOMER TENANT TABLE | | | |
| 1311 | 1312 | 1811 | 1812 |
| TENANT ID | TENANT NAME | DISPLAY NOTIFICATION TO ADMINISTRATOR | DISPLAY NOTIFICATION TO GENERAL PERSON |
| 1001AA | ABC Company | DISPLAY | NOT DISPLAY |
| 1002AA | ABC Japan | NOT DISPLAY | NOT DISPLAY |
| ... | ... | ... | ... |

FIG. 19

ACCOUNT TABLE 1900

| USER ID (701) | TENANT ID (702) | NOTIFIED REVISION (703) | ADMINISTRATOR (1901) |
|---|---|---|---|
| uid0000001 | 900AA | 0 | true |
| uid0000002 | 900AA | 1 | false |
| uid0000003 | 901AA | 3 | true |
| uid0000004 | 901AA | 1 | true |
| uid0000005 | 1001AA | 2 | true |
| uid0000006 | 1002AA | 0 | false |
| ... | ... | ... | ... |

FIG. 21

| EXCLUSION URL TABLE 2100 |
|---|
| 2101 |
| URL |
| http://xxxx |
| http://yyyy |
| ... |

FIG. 23

NOTIFICATION INFORMATION TABLE 2300

| NOTIFICATION ID 801 | REVISION 802 | PUBLICATION START DATE 803 | PUBLICATION END DATE 804 | AUTHENTICATION SYSTEM 2301 | NOTIFICATION CONTENT 805 |
|---|---|---|---|---|---|
| 1 | 1 | 2013/10/01 | 2013/10/15 | SSO | xxx |
| 2 | – | 2013/10/15 | 2013/10/22 | – | xxx |
| 3 | 2 | 2013/10/5 | 2013/10/12 | – | yyy |
| 4 | 3 | 2013/10/10 | 2013/10/22 | SSO | yyy |
| ... | ... | ... | ... | ... | ... |

FIG. 24

```
┌─────────────────────────────────────────────┐ ─ 2400
│            REGISTER NOTIFICATION            │
├─────────────────────────────────────────────┤
│                                             │
│   SERVICE          [ SERVICE X      ▼ ]─── 2401
│                                             │
│   PUBLICATION START DATE  [            ]── 2402
│                                             │
│   PUBLICATION END DATE    [            ]── 2403
│                                             │
│   RELATED AUTHENTICATION  ☐  SSO            │
│   SYSTEM                 2404               │
│                                             │
│   TITLE                                     │
│   [                                    ]── 2405
│                                             │
│   TEXT                                      │
│   ┌───────────────────────────────────┐── 2406
│   │ SERVICE X CANNOT BE USED DURING FOLLOWING │
│   │ PERIOD FOR MAINTENANCE            │
│   │ 2013/10/25 10:00:00 ~ 2013/10/25 11:00:00 │
│   │ ...                               │
│   └───────────────────────────────────┘
│                                             │
│          [ REGISTER ]   [ CANCEL REGISTRATION ]
│              2407              2408          │
└─────────────────────────────────────────────┘
```

AUTHENTICATION SERVER SYSTEM FOR PERFORMING CONTROL OF NOTIFICATIONS DURING SERVICE USE, CONTROL METHOD, AND STORAGE MEDIUM

BACKGROUND OF THE INVENTION

1. Field of the Invention

The present invention relates to an authentication server system that performs control relating to a notification during service use, a control method therefor, and a program therefor.

2. Description of the Related Art

In recent years, a system, which provides a function of software via the Internet, for example, called a service has been paid attention to. The service has a form called "multi-tenant service" that provides the same web application operating on a common server to a plurality of corporations or organizations. "Tenant" means a unit of corporations or organizations that provide the service using a conventional dedicated server.

In such a service, a service provider may transmit notification information such as system maintenance information and new function information to service users. Particularly when the service is stopped due to a system maintenance, a notification to the users becomes important. If the notification is not issued, the service looks suddenly stopped from viewpoints of the users, which may cause a problem. While a method for issuing the notification to each user by mail is also effective, that is not enough because mail addresses of some users may have not been unregistered. Therefore, a function of displaying the notification information has been required when the user logs in to the service.

As a function of displaying notification information when a user logs in to a system, which provides a service during service use, a method for managing display information in association with private information of the user has conventionally been known, as discussed in Japanese Patent Application Laid-Open No. 2003-256382. In this method, the notification information can be displayed on a screen when the user logs in by setting information of which a service provider desires to notify the user as forced display information for the user. A conventional technique relating to the notification information has been described above.

A conventional technique for authentication processing during mash-up of a service will be described below. A plurality of services, which cooperate with one another by the mash-up, is respectively separate services, so that their respective service providing systems need to be logged into. However, when the plurality of services cooperates with one another, a login screen is displayed every time each of the service providing systems is accessed. Thus, it takes much time and labor to perform a login operation. To save the time and labor, Single Sign On (SSO) based on a Security Assertion Markup Language (SAML) may be used. In a single sign on authentication system (hereinafter, referred to as an SSO), one service providing system is an Identity Provider (IdP), and another service providing system is a Service Provider (SP). A user can use another service without performing a login operation by logging into the service providing system serving as the IdP. For example, a service providing system for generating a Portable Document Format (PDF) is the IdP, and a service providing system for storing data on the Internet is the SP. When the user accesses a PDF generation service serving as the IdP, a login screen is displayed, and the user performs a login operation once. Then, when the generated PDF is stored in the service providing system serving as the SP, login to the SP is not required, and two services can seamlessly be mashed up.

SUMMARY OF THE INVENTION

When a plurality of services cooperates with one another using an SSO, if each of the services displays notification information, cooperation processing is stopped by displaying a notification. When a user performs a normal login operation to access the service, the user performs a screen operation with being conscious of the service. Therefore, if the notification information is displayed, it is not likely to be a problem. However, while the user can unconsciously use the plurality of services by SSO cooperation, an operational feeling obtained by seamless cooperation among the services may be damaged.

The present invention is directed to an authentication server system that performs notification control of notification information based on whether an authentication system is such an authentication system that a part of authentication processing including an SSO is omitted.

According to an aspect of the present invention, an authentication server system configured to perform authentication processing relating to use of a service, includes an authentication unit configured to perform authentication processing using both a first authentication system that requests a user to input authentication information and receives the input authentication information, to perform authentication processing based on the authentication information, and a second authentication system that performs authentication processing without requesting the user to input authentication information and receives the authentication information in response to authentication processing performed in another authentication server system different from the authentication server system having successfully been performed, a notification unit configured to issue a notification associated with the service to a terminal operated by the user, and a control unit configured to perform control so that the notification unit issues the notification if the terminal is permitted to use the service as a result of the authentication unit having performed the authentication processing using the first authentication system, and configured to perform control so that the notification unit does not issue the notification if the terminal is permitted to use the service as a result of the authentication unit having performed the authentication processing using the second authentication system.

Further features of the present invention will become apparent from the following description of exemplary embodiments with reference to the attached drawings.

BRIEF DESCRIPTION OF THE DRAWINGS

FIG. 7 illustrates an account table retained by the authentication server 103.

FIG. 8 illustrates a notification information table retained by the service management server 104.

FIG. 12 illustrates a notification information table retained by a service management server 104.

FIG. 13 illustrates a tenant table retained by an authentication server 103.

FIG. 14 illustrates a license table retained by the authentication server 103.

FIG. 16 illustrates a customer tenant table retained by the authentication server 103.

FIG. 18 illustrates a sales tenant table 1800 and a customer tenant table 1810 retained by the authentication server 103.

FIG. 19 illustrates an account table retained by the authentication sever 103.

FIG. 21 illustrates an exclusion URL table retained by the service management server 104.

FIG. 23 illustrates a notification information table retained by the service management server 104.

FIG. 24 illustrates a notification information registration screen.

DESCRIPTION OF THE EMBODIMENTS

A service in the present invention means a function to be provided by an information processing apparatus. A web application for implementing the service is software to be executed by a server computer. When a plurality of services cooperates with one another, an SSO by an SAML may be used to make a user seem to use the one service. The user can use all the services, which cooperate with one another, by logging in once. In a first exemplary embodiment, the SSO is used as an example, to describe an information processing system that performs control not to perform notification to a client when an authentication system used during authentication processing is the SSO.

Figure 1:
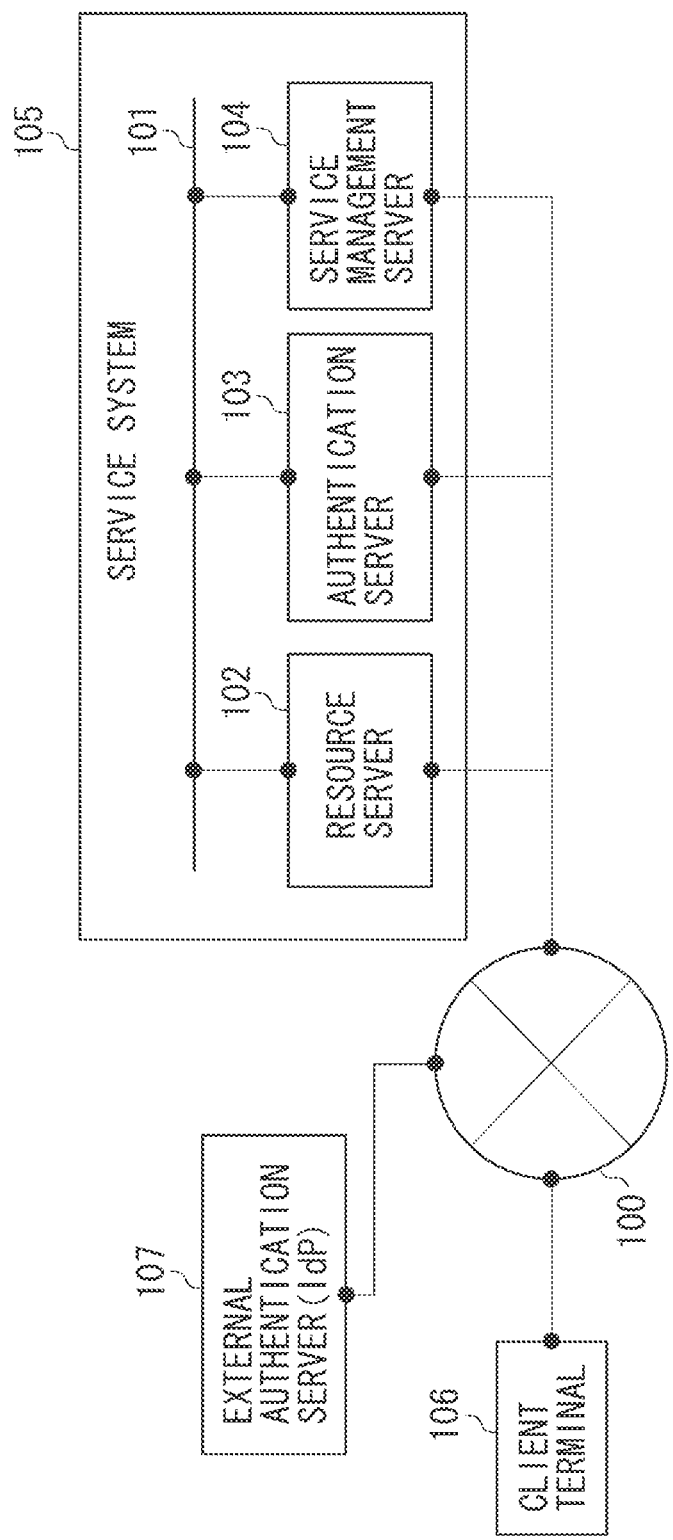
FIG. 1 illustrates an entire system.

FIG. 1 illustrates an information processing system according to the present exemplary embodiment. The Internet 100 is a public network, which can be externally connected, such as the Internet. An intranet 101 is a private network, which cannot be externally connected, such as a local area network (LAN).

A resource server 102 is a service system that provides a resource service such as a printing service or a form service. The resource server 102 provides a resource service in response to a request from a client terminal 106 via the Internet 100 or an external service system (not illustrated). The number of resource services installed in the resource server 102 may be one or more.

An authentication server 103 is an authentication server that authenticates a user. The authentication server 103 performs control so that the user can access the resource server 102 or a service management server 104. The service management server 104 manages notification information and generates a notification information screen.

The resource server 102, the authentication server 103, and the service management server 104 cooperate with one another, to constitute a service system 105. The service system 105 is a service providing system, and is a server group required in providing services to the user. The resource server 102, the authentication server 103, and the service management server 104 may be configured on the same server, may be configured on the same LAN, or may be configured respectively on different LANs. While each of the servers includes one server in the first exemplary embodiment, it may include a plurality of servers. Accordingly, if each of the servers is referred to as a server system in the present invention, the server means a server including one or a plurality of servers. If the server is referred to as an authentication server system, for example, it is one authentication server 103 or a server group including a plurality of authentication servers 103 and service management servers 104.

The client terminal 106 is an information-processing equipment terminal used when a service of a personal computer or a mobile terminal is used via the Internet 100. A web browser is installed in the client terminal 106. An external authentication server 107 is an identity provider (IdP), and is an authentication server provided separately from the authentication server 103 in the service system 105.

Figure 2:
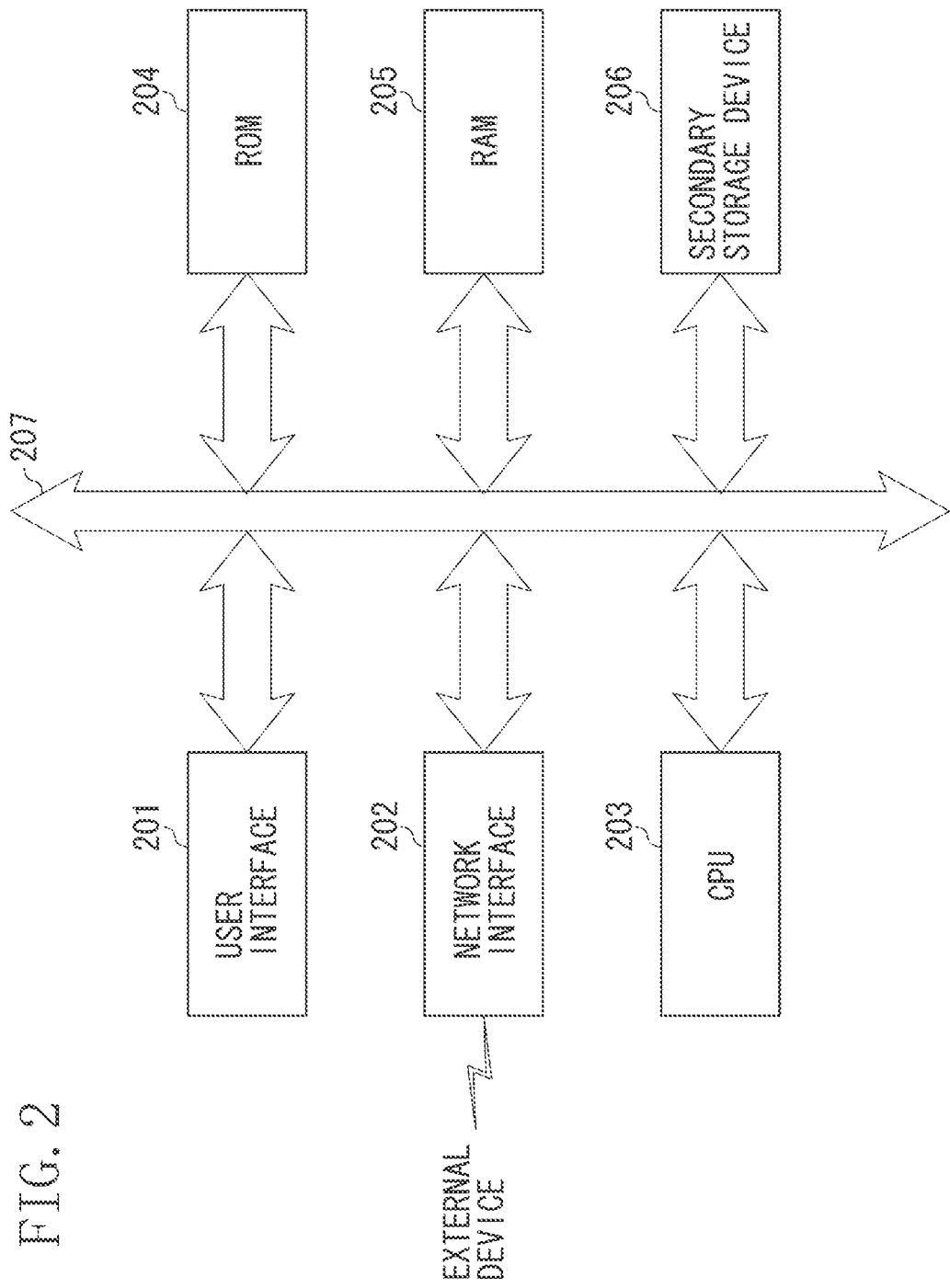
FIG. 2 illustrates a hardware configuration of a server.

FIG. 2 illustrates a logical configuration of a server in which various services illustrated in FIG. 1 are arranged. A user interface 201 is hardware for inputting/outputting information using a display, a keyboard, and a mouse. A computer not including the hardware can also be connected/operated from another computer using a remote desktop. A network interface 202 is hardware connected to a network such as a LAN for communicating with another computer or a network device. A central processing unit (CPU) 203 executes programs read from a read-only memory (ROM) 204, a random access memory (RAM) 205, and a secondary storage device 206, and implements the various services. The ROM 204 is a storage device having an incorporated program and data recorded thereon. The RAM 205 is a temporary memory area. The secondary storage device 206 is an external storage device represented by a hard disk drive (HDD). The units are connected to one another via an input/output interface 207.

Figure 3:
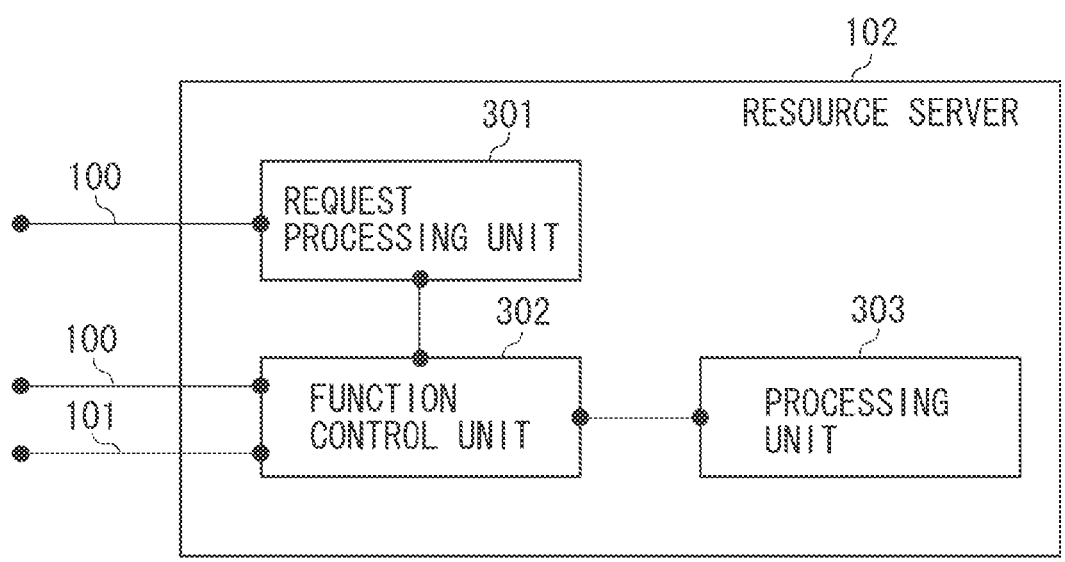
FIG. 3 illustrates a software configuration of a resource server 102.

FIG. 3 is a block diagram illustrating a software structure of the resource server 102. A request processing unit 301 is a processing unit that processes a request for the resource service that has been transmitted via the Internet 100. If the resource service is a form service, for example, the request processing unit 301 receives a form data generation request and a form data acquisition request. The request processing unit 301 returns a processing result returned from a function control unit 302 to the request source. The function control unit 302 performs required processing in response to the request received by the request processing unit 301, and returns response data to the request source. The function control unit 302 transits an authentication request to the authentication server 103 via the intranet 101, and receives an authentication result therefrom. A processing unit 303 receives a request from the function control unit 302, to perform processing corresponding to the request, and returns the processed result to the function control unit 302. If the resource service is the form service, for example, the processing unit 303 receives the form data generation request, to generate form data from original data.

Figure 4:
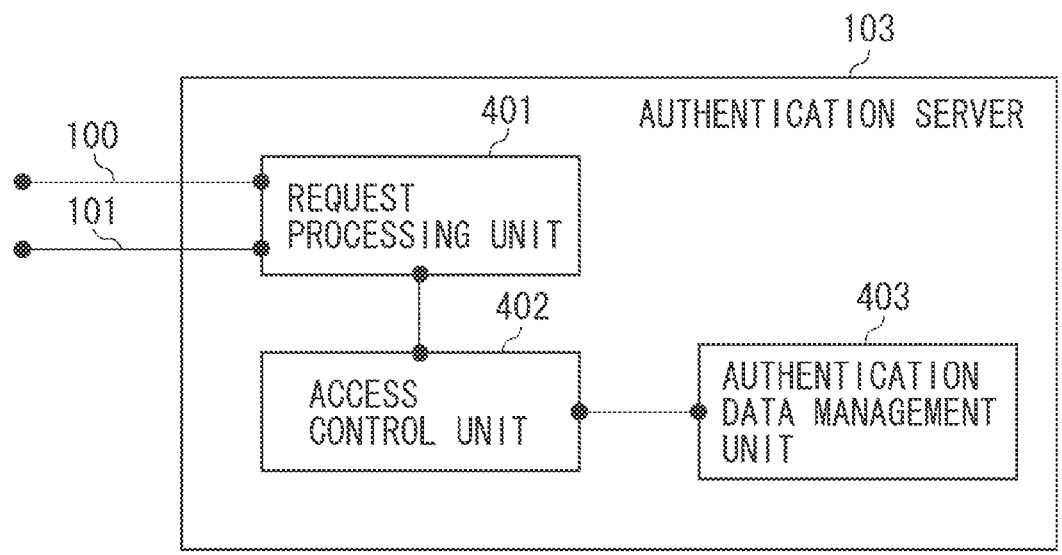
FIG. 4 illustrates a software configuration of an authentication server 103.

FIG. 4 is a block diagram illustrating a software structure of the authentication server 103. A request processing unit 401 is a processing unit that processes a request for the authentication server 103 received via the Internet 100 and the intranet 101. The request processing unit 401 returns response data returned from an access control unit 402 to the request source. The access control unit 402 is a processing unit that processes authentication and approval requests from each of the resource servers within the service system 105 based on data acquired from the data management unit 403, and verifies an SAML sent from an IdP. The authentication data management unit 403 manages data representing a user account. The service system 105 can be said to be an SP. The authentication server 103 performs authentication processing using an authentication system for performing authentication processing based on input authentication information about the user, an authentication system using an SSO, and both of them. Details will be described below with reference to FIGS. 10 and 11.

Figure 5:
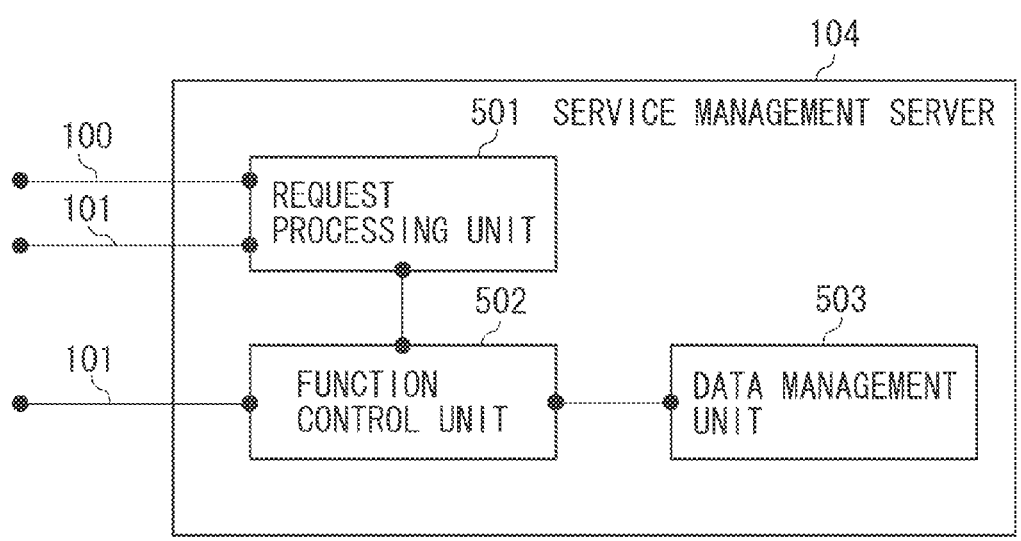
FIG. 5 illustrates a software configuration of a service management server 104.

FIG. 5 is a block diagram illustrating a software structure of the service management server 104. A request processing unit 501 is a processing unit that processes a request for the service management server 104. The request processing unit 501 returns response data returned from a function control unit 502 to the request source. The function control unit 502 is a processing unit that requests the authentication server 103 to acquire user information, and controls display of notification information based on acquired data and data to be acquired from the data management unit 503. The data management unit 503 manages data representing the notification information.

Figure 6:
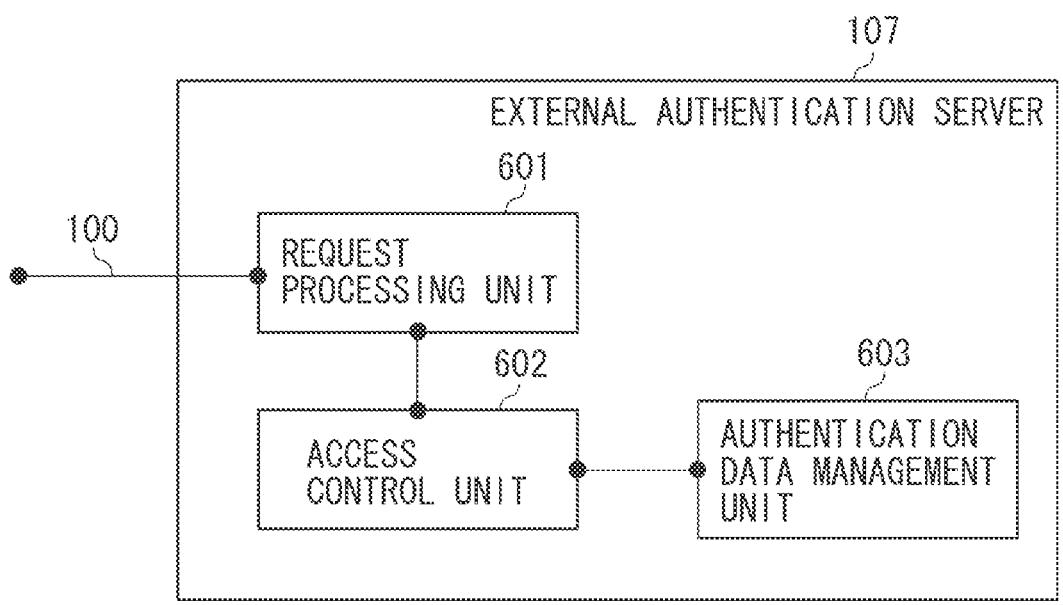
FIG. 6 illustrates a software configuration of an external authentication server 107.

FIG. 6 is a block diagram illustrating a software structure of the external authentication server (IdP) 107. The request processing unit 601 is a processing unit that processes a request for the authentication server 103 received via the Internet 100 and the intranet 101. The request processing unit 601 returns response data returned from an access control unit 602 to the request source. The access control unit 602 is a processing unit that processes authentication and approval requests from the service system 105 based on data acquired from a authentication data management unit 603. The access control unit 602 requests the SP to verify the SAML. The authentication data management unit 603 manages data representing a user account.

FIG. 7 illustrates a data structure of user account information to be managed by the authentication server 103 in a table format. An account table 700 includes a user identifier (ID) 701, a tenant ID 702, and a notification revision 703. The tenant ID 702 is an ID for uniquely identifying a tenant to which a user belongs in the system. The notification revision 703 is a number representing notification information displayed to the user. The notification revision 703 stores a revision number registered in a notification information table 800, described below.

FIG. 8 illustrates a data structure of notification information to be managed by the service management server 104 in a table format. The notification information table 800 includes a notification ID 801, a revision 802, a publication start date 803, a publication end date 804, and a notification content 805. The publication start date 803 and the publication end date 804 are collectively defined as a notification period because they may be managed as the number of publication days. The revision 802 is information numbered at the time point where the notification information has been published for indicting to which notification the user has displayed. More specifically, October 12, 2013 is a publication start date of a notification having a notification ID "5". Since a maximum value of a revision number registered in the notification information table 800 at that time point is "3", a revision number "4" is assigned to the notification ID "5". The notification content 805 is a character string to be displayed on a notification screen. The notification content 805 may be managed in separate tables for each language.

Figure 9:
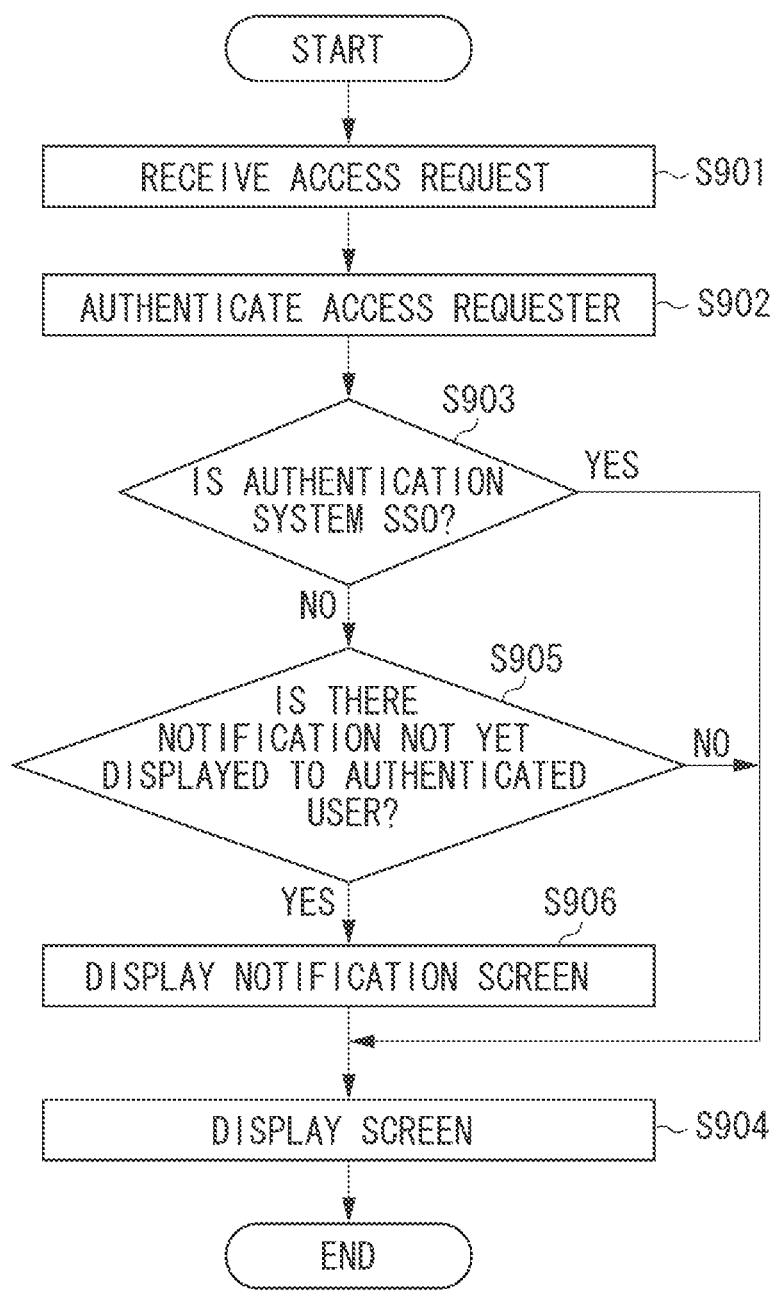
FIG. 9 is a flowchart illustrating a notification information display determination flow, to a user.
Figure 10:
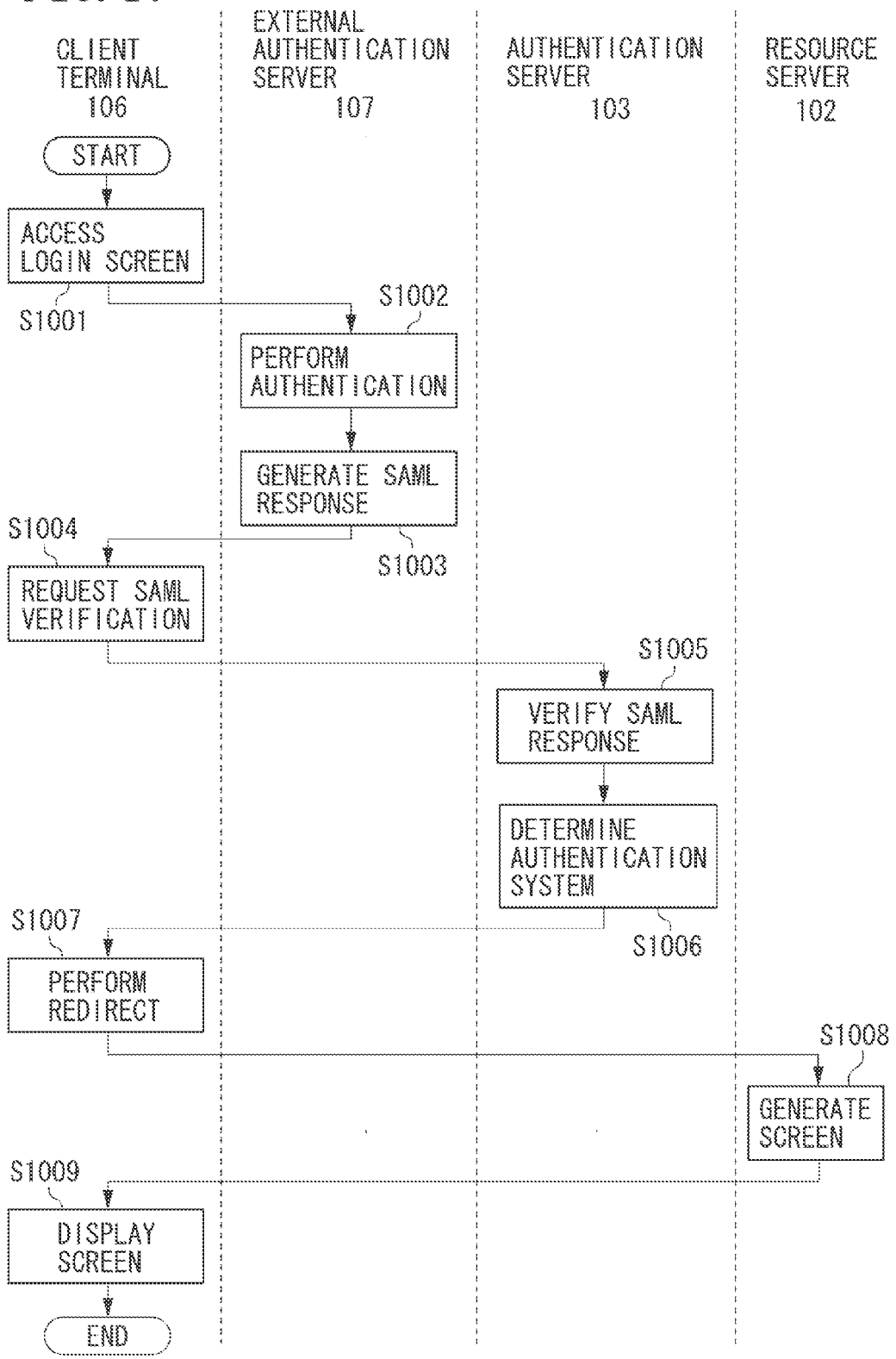
FIG. 10 is a flowchart illustrating a notification information display determination flow performed when a user has performed access using an SSO.
Figure 11:
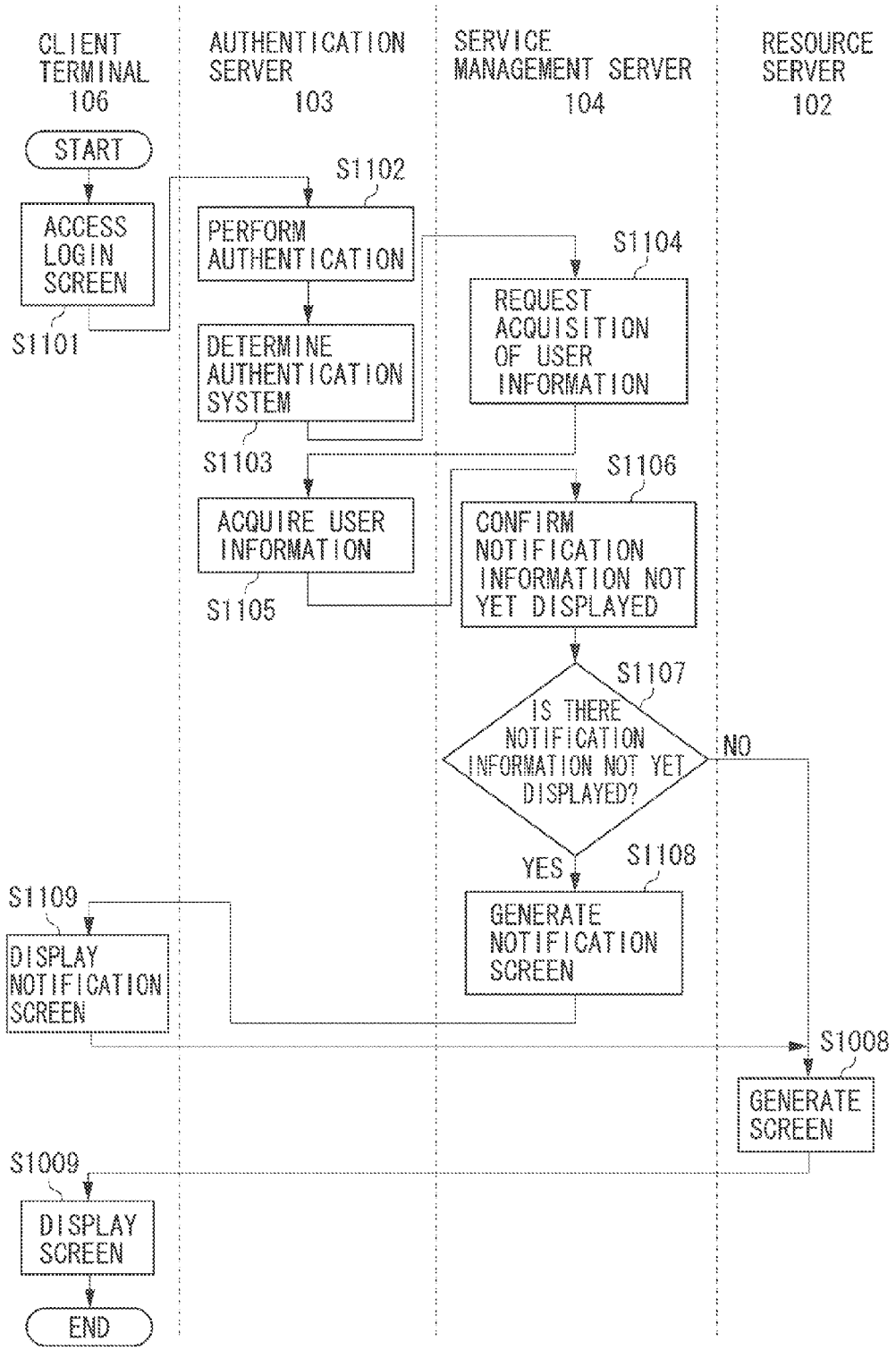
FIG. 11 is a flowchart illustrating a notification information display determination flow performed when a user has performed access using a method other than the SSO.

FIG. 9 is a flowchart illustrating a notification information display determination flow performed when the service system 105 including the resource server 102, the authentication server 103, and the service management server 104 receives an access request from the client terminal 106 serving as a terminal mounting the web browser. FIGS. 10 and 11, described below, illustrate specific transmission and receiving of data between the servers in the service system 105.

In step S901, the service system 105 receives the access request. In step S902, the service system 105 authenticates an access requester. In step S903, the service system 105 determines whether a system for the authentication, which has been performed in step S902, is an SSO. If the authentication system is the SSO (YES in step S902), the service system 105 determines that notification information about the service system 105 is controlled not to be displayed, and the processing proceeds to step S904. In step S904, the service system 105 displays a screen that has been requested to be accessed in step S901. While a method for determining whether the authentication system is the SSO has been described in step S902, the method may be a method for determining whether the authentication system is the SSO or another authentication system based on the type thereof.

If the authentication system is not the SSO (NO in step S902), i.e., if the authentication system is an authentication system in which the authentication server 103 requests the user to input authentication information and receive the input authentication information, to perform authentication processing based on the authentication information, then in step S905, the service system 105 confirms whether notification information being published include notification information that has not yet been displayed to an authenticated user. If there is no notification information being published, or if all the notification information being published have already been displayed to the authenticated user, the service system 105 determines that there is no notification (NO in step S905), and the processing proceeds to step S904. In step S904, the service system 105 displays a screen that has been requested to be accessed. If there is notification information being published (YES in step S905), then in step S906, the service system 105 generates a notification screen (not illustrated), and displays the notification screen. On the notification screen, all the notification information being published may be displayed, or only the notification information, which has not yet been displayed to the user who has logged in, may be displayed. If the authentication system is the SSO (YES in step S902), then in step S904, the service system 105 displays a screen required in receiving a service without displaying a notification screen.

FIG. 10 is a sequence diagram illustrating a processing method performed when the user logs in from a web page on the external authentication server 107 serving as the IdP and accesses the service system 105 using the SSO by the SAML. As a premise, all settings required for the SSO by the SAML have previously been performed in the authentication server 103 and the external authentication server 107 serving as the IdP.

In step S1001, a web browser (not illustrated) on the client terminal 106 is used, to access a login screen (not illustrated) of the external authentication server 107. In step S1002, the external authentication sever 107, which has been accessed, performs authentication processing based on user authentication information that has been input from the client terminal 106. In step S1003, the external authentication server 107 generates an SAML response. SAML response generated by a general IdP includes information for identifying the authenticated user, and information about the response is electronically signed. The external authentication server 107 instructs the service system 105 to perform redirection while returning a response to the client terminal 106.

In step S1004, the web browser on the client terminal 106 requests the authentication server 103 to verify the SAML, together with the SAML response that has been received from the external authentication server 107. In step S1005, the authentication server 103 verifies whether the received SAML response is normal. In the verification, the authentication server 103 verifies whether an electronic signature of the SAML response is normal based on an electronic certificate of the IdP previously set, and then acquires user identification information included in the SAML response. Further, the authentication server 103 converts the user identification information acquired from the SAML response into the user of the system managed by the authentication server 103 to permit the user to log in based on mapping information about the user of the IdP previously set and the user of the system, to generate an authentication session.

In step S1006, the authentication server 103 determines whether an authentication system for access to the service system 105 is the SSO by the SAML or the other authentication system. The authentication server 103 is set to hook all responses of access to web pages on the authentication server 103. Processing can be freely added to a general web server during processing of a HyperText Transfer Protocol (HTTP) function by adding an external module thereto. An SSO hook module is added to the authentication server 103 to determine whether the authentication system is the SSO, and to hook HTTP responses to all the web pages on the authentication server 103.

The SSO hook module is executed in processing of all responses in the authentication server 103 so that a response to a login screen, for example, is also hooked. The authentication server 103 stores a Uniform Resource Locator (URL) for the SAML verification and confirms a request URL of the hooked response to determine whether the authentication system uses the SAML. If "/auth/Saml/SP/SSO/Post" has been retained as the URL for the SAML verification, for example, the request URL of the hooked response is confirmed, and is compared with the URL for the SAML verification. If the hooked response is a request for the URL for the SAML verification, the authentication server 103 determines that the authentication system is the SSO by the SAML. Further, the authentication server 103 determines, when it verifies that the authentication system is the SSO by the SAML, that notification information is not displayed, to return a response.

In step S1007, the web browser on the client terminal 106 performs redirection to a redirect destination URL of a resource service after the success of the SAML verification, included in the response received from the authentication server 103. In step S1008, the resource server 102 generates a requested screen, to return the generated screen to the client terminal 106. In step S1009, the received screen is displayed on the web browser on the client terminal 106.

FIG. 11 is a sequence diagram illustrating a processing method performed when the user logs in from the web page on the authentication server 103 serving as the SP, inputs an ID and a password serving as authentication information, and accesses the service system 105. More specifically, FIG. 11 is a flow in which authentication processing is not the authentication processing using the SSO as the authentication system illustrated in the flow of FIG. 10.

In step S1101, a web browser (not illustrated) on the client terminal 106 is used, to access a login screen (not illustrated) of the authentication server 103. In step S1102, the authentication server 103, which has been accessed, performs authentication processing. In step S1103, the authentication server 103 generates an SAML response, confirms a URL of a hooked response, and determines whether the authentication system is the SSO by the SAML or the other authentication system. The authentication server 103 delivers an authentication result to the service management server 104, and requests a notification display determination to the service management server 104 when it is determined that the authentication system is other than the SSO.

In step S1104, the service management server 104 uses a received authentication result, and requests the authentication server 103 to acquire information about the authenticated user. In step S1105, the authentication server 103 acquires the information about the authenticated user from the account table 700, and returns the acquired information to the service management server 104. In this example, a user assigned a user ID "uid0000002" has performed access on "October 10, 2013".

In step S1106, the service management server 104 determines whether there is notification information, which has not yet been displayed to the authenticated user, from information in the notification information table 800 and the acquired user information. More specifically, the service management server 104 determines that there are revisions "1", "2", and "3" as notification information, which is currently being published, from the notification information table 800. Since a revision of which the user assigned the user ID "uid0000002" has already been notified is "1", it is determined that the revisions "2" and "3" have not yet been displayed.

In step S1107, the service management server 104 determines whether there is notification information that has not yet been displayed to the authenticated user. If there is no notification information that has not yet been displayed (NO in step S1107), then in step S1008, the service management server 104 generates the screen that has been requested in step S1007, and displays the generated screen on the web browser on the client terminal 106. If there is notification information that has not yet been displayed (YES in step S1107), then in step S1108, the service management server 104 generates a notification screen (not illustrated), and returns the generated notification screen to the client 106. On the notification screen, all notification information being published may be displayed. Alternatively, only the notification information, which has not yet been displayed to the user who has logged in, may be displayed. More specifically, all the revisions and "1", "2", and "3" serving as the notification information being published may be displayed. Only the revisions "2" and "3", which have not yet been displayed to the user assigned the user ID "uid0000002", may be displayed. In step S1109, the client terminal 106 displays the received notification screen. The notification screen may be displayed on the same screen after transition from the login screen, or may be opened by being popped up in a separate window. Then, the requested screen is displayed, like in FIG. 10.

In the present exemplary embodiment, the notification information is not displayed to the user who has performed access using the SSO by the SAML, but the notification information, which has not yet been displayed, can be displayed to the user who has performed access using the method other than the SSO by the SAML.

A second exemplary embodiment in which notification information is not forcedly displayed during authentication will be described below. In a service serving as a multitenant service, a user belongs to a tenant representing an organization or a corporation, and uses the service according to a setting of the tenant. In the service, a sales company that sells the service to the user may also be managed as a tenant. A user (hereinafter referred to as a sales user) belonging to a tenant for the sales company (hereinafter referred to as a sales tenant) can generate a tenant for a customer (hereinafter referred to as a customer tenant) and provide the service to the customer tenant.

Such a setting that the notification information is not displayed on a screen even in an authentication system other than an SSO by an SAML can be performed by placing importance to convenience depending on the sales tenant. In the present exemplary embodiment, a system for determining whether the notification information is displayed in units of sales tenants will be described in addition to the authentication system.

FIG. 12 illustrates a data structure of notification information to be managed by a service management server 104 when the system determines whether the notification information is displayed in units of sales tenants in a table format, in addition to the authentication system. A notification information table 1200 includes a notification ID 801, a revision 802, a license ID 1201, a publication state date 803, and a publication end date 804. The license ID 1201 is an ID representing a service to which the notification information is related.

FIG. 13 illustrates a data structure of tenant information to be managed by an authentication server 103 in a table format. A sales tenant table 1300 and a customer tenant table 1310 are tables for managing a sales tenant and for managing a customer tenant, respectively. The sales tenant table 1300 includes a tenant ID 1301, a tenant name 1302, and a notification display 1303. The notification display 1303 is a setting whether a notification, which has not yet been displayed, is displayed when authentication is performed using a method other than the SSO by the SAML. If the notification display 1303 is "not display", a notification screen is not displayed even when there is a notification that has not yet been displayed to the user who has logged in. The customer tenant table 1310 includes a tenant ID 1311 and a tenant name 1312.

FIG. 14 illustrates a data structure of service information to be managed by the authentication server 103 in a table format. A service table 1400, a license table 1410, and a sales right table 1420 respectively are used to manage information for managing a service, information for managing a service usable by a customer tenant, and information for managing a service that can be sold by a sales tenant. When a user belonging to the sales tenant sells a service to a customer, a license corresponding to the service is set in a target customer tenant. A user belonging to a customer tenant can use a service corresponding to a license set on the customer tenant. The service table 1400 includes a service name 1401 and a license ID 1402. The license ID 1402 is an ID for the system to uniquely identify a service. The license table 1410 includes a tenant ID 1411, a license ID 1412, and a sales tenant ID 1413. The tenant ID 1411 represents a customer tenant on which a license has been set. The license ID 1412 represents the license set in the customer tenant. The sales tenant ID 1413 represents a tenant ID of a sales tenant to which a sales user who has set the license on the customer tenant belongs. The sales right table 1420 includes a tenant ID 1421 and a license ID 1422.

Figure 15:
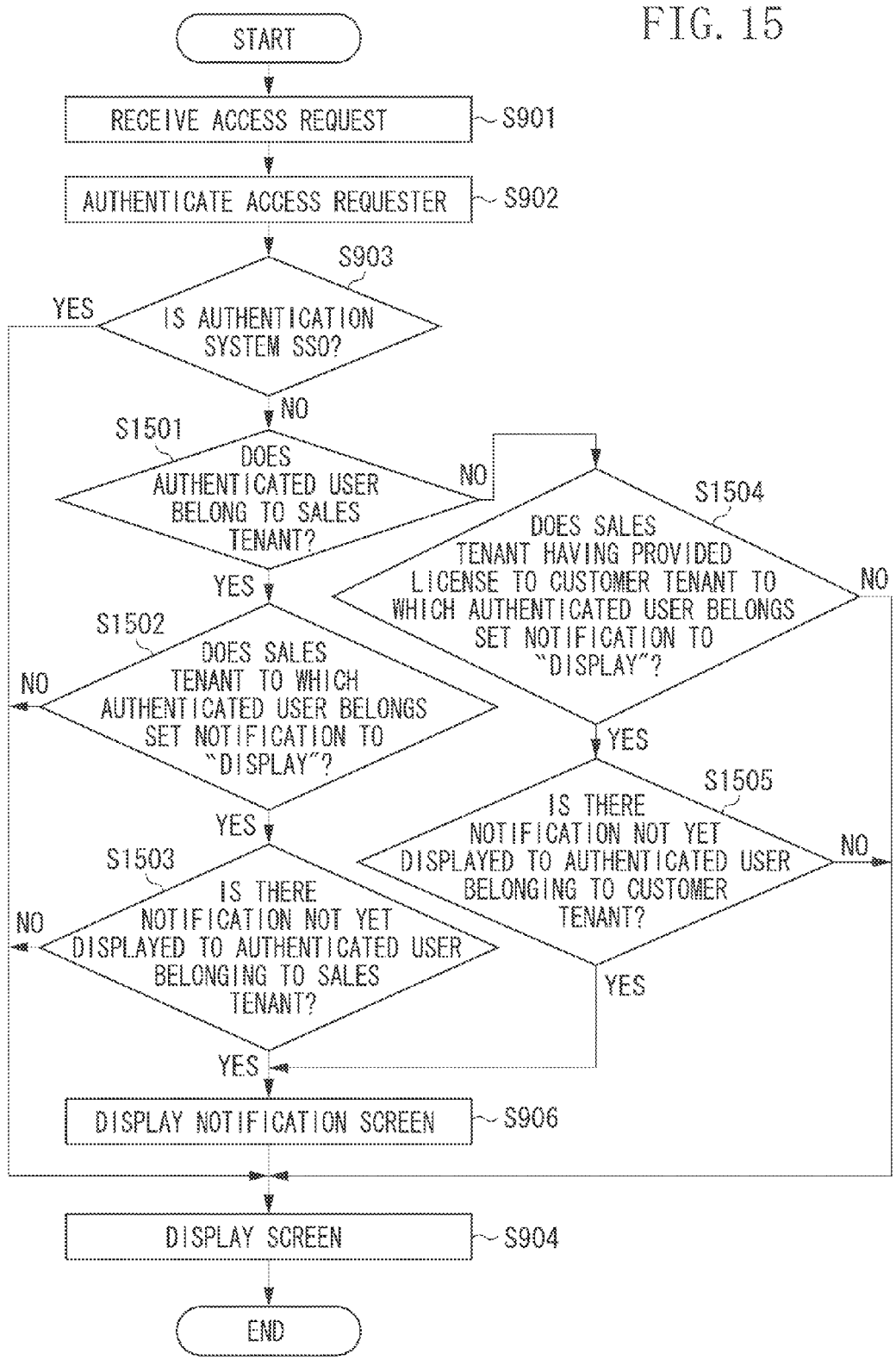
FIG. 15 is a flowchart illustrating a notification information display determination flow performed by a sales company that has provided a license when a user has performed access.

FIG. 15 is a flowchart illustrating a notification information display determination flow performed when the service system 105 receives an access request in the present exemplary embodiment. Steps S901 to S903 are similar to those in the flowchart described in FIG. 9. In step S1501, the service system 105 acquires a tenant to which an authenticated user belongs from the account table 700, and determines whether the authenticated user belongs to a sales tenant from the sales tenant table 1300 and the customer tenant table 1310. If the authenticated user belongs to the sales tenant (YES in step S1501), the processing proceeds to step S1502. If the authenticated user belongs to a customer tenant (NO in step S1501), the processing proceeds to step S1504.

In step S1502, the service system 105 acquires notification information about the sales tenant to which the authenticated user belongs from the sales tenant table 1300, and determines whether the sales tenant to which the authenticated user belongs sets a notification to "display". If the sales tenant to which the authenticated user belongs sets the notification to "not display" (NO in step S1502), the service system 105 does not display the notification information, and the processing proceeds to step S904 described in FIG. 9. In step S904, the service system 105 displays an access request destination screen. If the sales tenant sets the notification to "display" (YES in step S1502), the processing proceeds to step S1503.

In step S1503, the service system 105 determines whether there is a notification that has not yet been displayed to the authenticated user belonging to the sales tenant. The service system 105 acquires a service, which can be handled by a target sales tenant, from the sales right table 1420 and the service table 1400, and acquires notification information being published about the service, which can be handled by the target sales tenant, from the notification information table 1201. The service system 105 then acquires a revision, of which the authenticated user has already been notified, from the account table 700, and determines notification information to be displayed. If there is no notification information being published, or if the user has already been notified of all notification information being published, about the service that can be handled by the sales tenant to which the authenticated user belongs (NO in step S1503), the service system 105 does not display the notification, and the processing proceeds to step S904. If there is a notification that has not yet been displayed to the authenticated user, about the service that can be handled by the tenant to which the authenticated user belongs (YES in step S1503), then in step S906, the service system 105 displays the notification information. The subsequent flow has been described in FIG. 9.

For example, a user assigned a user ID "uid0000001" has performed access on "October 10, 2013". The user assigned the user ID "uid0000001" is found to belong to a tenant ID "900AA" from the account table 700, and is determined to belong to a sales tenant from the sales tenant table 1300. The tenant ID "900AA" sets a notification to "display" from the sales tenant table 1300. Thus, the service system 105 determines notification display. From the service table 1400 and the sales right table 1420, the tenant ID "900AA" is found to be able to handle a "service L" corresponding to a license ID "1" and a "service N" corresponding to a license ID "3". From the account table 700, the user assigned the user ID "uid0000001" is found to display notification information up to a "revision 1". The service system 105 determines that notification information, i.e., a revision "2" corresponding to the service L and a revision "3" corresponding to the service N are displayed based on these information and the notification information table 1200.

If the authenticated user belongs to a customer tenant (NO in step S1503), then in step S1504, the service system 105 acquires a sales tenant which has provided a license to the customer tenant to which the authenticated user belongs from the license table 1410, and determines whether each of sales tenants sets a notification to "display" from the sales tenant table 1300. If all the sales tenants, on which the licenses have not been set, set the notification to "not display" ((NO in step S1504), the service system 105 does not display notification information, and the processing proceeds to step S904 described in FIG. 9. In step S904, the service system 105 displays an access request destination screen. If any one of the sales tenants sets the notification to "display" (YES in step S1504), the processing proceeds to step S1505.

In step S1505, the service system 105 determines whether the authenticated user is notified of a service, which has been set from the sales tenant that has set the notification to "display". The service system 105 determines whether there is a notification being published in the service set from the sales tenant that has set the notification to "display" from the notification information table 1200. The service system 105 then acquires a revision, of which the authenticated user has already been notified, from the account table 700, and determines notification information to be displayed. If there is no notification being published, or if the authenticated user has already been notified of all notification information being published (NO in step S1505), the service system 105 does not display the notification, and the processing proceeds to step S904. If there is a notification that has not yet been displayed to the authenticated user (YES in step S1505), then in step S906, the service system 105 displays the notification information. The subsequent flow has been described in FIG. 9.

For example, a user assigned a user ID "uid0000006" has performed access on "October 10, 2013". From the account table 700, the user assigned the user ID "uid0000006" is found to belong to a tenant ID "1002AA", and is determined to display notification information up to a revision "1". From the customer tenant table 1310, the user is determined to belong to a customer tenant. From the license table 1410, a license ID "1" and license IDs "2" and "3" are respectively found to be set from a sales tenant "900AA" and a sales tenant "901AA". From the sales tenant table 1300, the sales tenant "900AA" and the sales tenant "901AA" set a notification to "display" and "not display", respectively. Thus, the service system 105 determines that only a notification of a "service L" corresponding to the license ID "1" is displayed to the user belonging to the tenant ID "1002AA". The service system 105 determines that notification information, i.e., a revision "2" corresponding to the service "L" is displayed based on these information and the notification information table 1200.

In the method according to the second exemplary embodiment, control can be performed as to whether the notification information, which has not yet been displayed, is displayed by setting the sales tenant to the user who has performed access using the method other than the SSO by the SAML.

A third exemplary embodiment in which notification information is not forcedly displayed during authentication will be described below. In a service serving as a multitenant service, an organization or a corporation is managed in units of tenants. Each of the tenants can be customized for each corporation or organization. Thus, such a setting that the notification information is not displayed on a screen even in an authentication system other than an SSO by an SAML can be performed for each customer tenant. In the present exemplary embodiment, a system for determining whether the notification information is displayed in units of customer tenants will be described in addition to the authentication system.

FIG. 16 illustrates a data structure of customer tenant information to be managed by an authentication server 103 in a table format. A customer tenant table 1600 includes a tenant ID 1311, a tenant name 1312, and a notification display 1601. The notification display 1601 is a setting whether a notification, which has not yet been displayed, is displayed when authentication is performed using a method other than the SSO by the SAML. If the notification display 1601 is "not display", a notification screen is not displayed even when there is a notification that has not yet been displayed to a user who has logged in.

Figure 17:
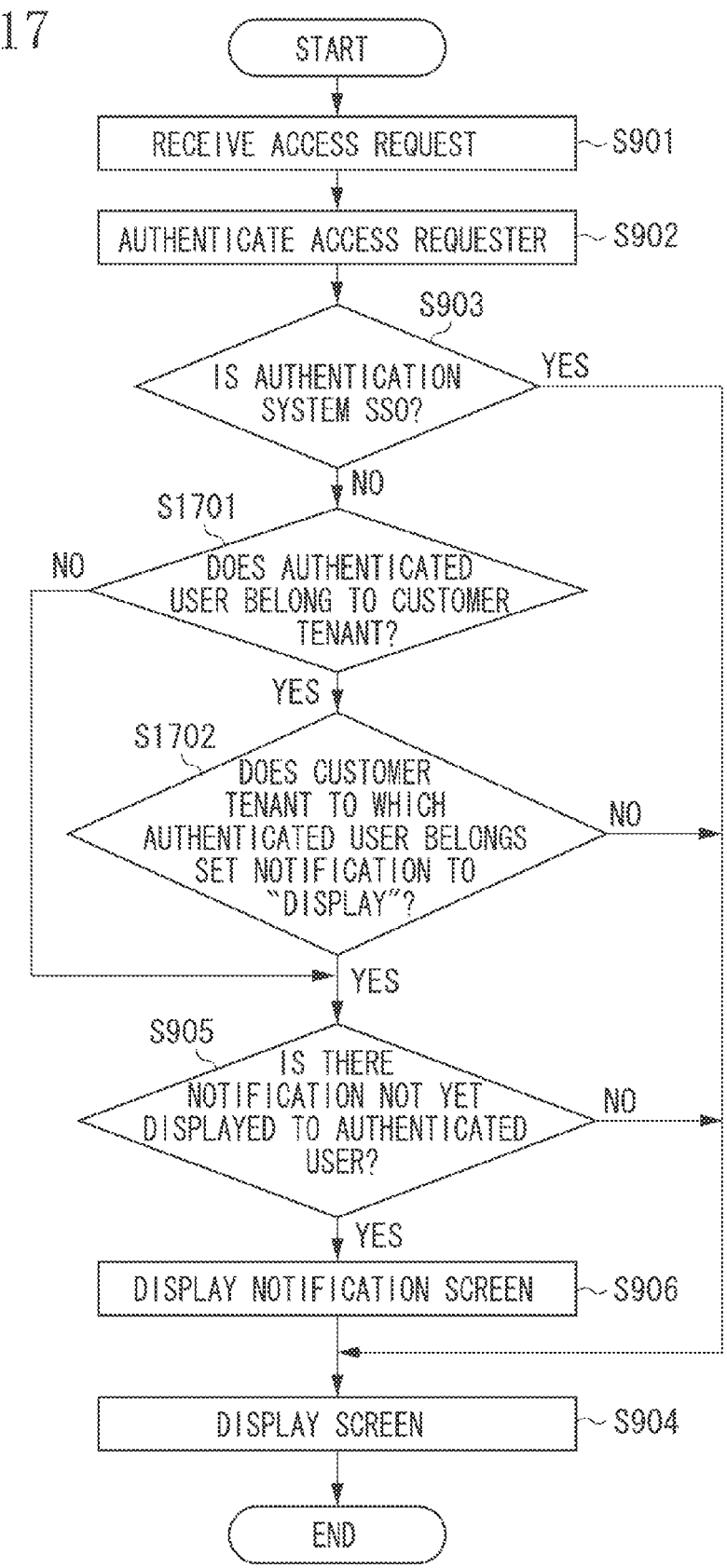
FIG. 17 is a flowchart illustrating a notification information display determination flow in units of tenants performed when a user has performed access.

FIG. 17 is a flowchart illustrating a notification information display determination flow performed when a service system 105 receives an access request in the present exemplary embodiment. Steps S901 to S903 are similar to those in the flow described in FIG. 9. In step S1701, the service system 105 acquires a tenant to which an authenticated user belongs from an account table 700, and determines whether the authenticated user belongs to a customer tenant from the customer tenant table 1600. If the authenticated user belongs to the customer tenant (YES in step S1701), the processing proceeds to step S1702. If the authenticated user does not belong to the customer tenant (NO in step S1701), the processing proceeds to step S905. In step S905 and the subsequent steps, the flow described in FIG. 9 is executed.

In step S1702, the service system 105 confirms a notification of the tenant to which the authenticated user belongs from the customer tenant table 1600, and determines whether the customer tenant to which the authenticated user belongs sets the notification to "display". If the notification is set to "display" (YES in step S1702), the processing proceeds to step S905. In step S905 and the subsequent steps, the flow described in FIG. 9 is executed. If the notification is set to "not display" (NO in step S1702), the service system 105 does not display notification information, and the processing proceeds to step S904 described in FIG. 9. In step S904, the service system 105 displays an access request destination screen. For example, a user assigned a user ID "uid0000006" has performed access on "October 10, 2013". From the account table 700, the user assigned the user ID "uid0000006" is found to belong to a tenant ID "1002AA", and is found to display notification information up to a revision "1". From the customer tenant table 1600, the authenticated user is determined to belong to a customer tenant, and is found to belong to a tenant that sets a notification to "not display". Thus, the service system 105 determines that the notification is not displayed.

In the method according to the third exemplary embodiment, control can be performed as to whether the notification information, which has not yet been displayed, is displayed by setting the customer tenant to the user who has performed access using the method other than the SSO by the SAML.

A fourth exemplary embodiment in which notification information is not forcedly displayed during authentication will be described below. In a service serving as a multitenant service, an administrator of a corporation or an organization and a general user are managed in a mixed state within a tenant. When a general user account and an administrator account are separately managed, if escalation from the general user has occurred, a new account needs to be generated, which takes much time and labor. Further, current user information and setting cannot be taken over. Therefore, the general user account can also be the administrator account by setting authority in the general user account.

Such a setting that the notification information is not displayed on a screen even in an authentication system other than an SSO by an SAML can be performed depending on authority of a user. Even when there is a notification, for example, the notification can be displayed to not the general user but only the administrator. In the present exemplary embodiment, a system for determining whether the notification information is displayed in units of user accounts will be described in addition to an authentication system.

FIG. 18 illustrates a data structure of tenant information to be managed by an authentication server 103 in a table format. A sales tenant table 1800 and a customer tenant table 1810 respectively are a table for managing a sales tenant and a table for managing a customer tenant. The sales tenant table 1800 includes a tenant ID 1301, a tenant name 1302, a notification display to an administrator 1801, and a notification display to a general person 1802. The notification display to an administrator 1801 is a setting whether a notification, which has not yet been displayed to the administrator of the sales tenant, is displayed when authentication is performed using a method other than the SSO by the SAML. If the notification display to an administrator 1801 is "not display", a notification screen is not displayed even when there is a notification that has not yet been displayed to a user having an administrator account has logged in. The notification display to a general person 1802 is a setting whether a notification, which has not yet been displayed to the general user belonging to a sales tenant is displayed to the general user when authentication is performed using a method other than the SSO by the SAML.

A customer tenant table 1810 includes a tenant ID 1311, a tenant name 1312, a notification display to an administrator 1811, and a notification display to a general person 1812. The notification display to an administrator 1811 is a setting whether a notification, which has not yet been displayed to the administrator of the customer tenant, is displayed when authentication is performed using the method other than the SSO by the SAML. If the notification display to an administrator 1811 is "not display", a notification screen is not displayed even when there is a notification that has not yet been displayed to the user serving as an administrator account who has logged in. The notification display to a general person 1812 is a setting whether a notification, which has not yet been displayed to a general user belonging to a customer tenant is displayed when authentication is performed using a method other than the SSO by the SAML.

FIG. 19 illustrates a data structure of user account information to be managed by the authentication server 103 in a table format. An account table 1900 includes a user ID 701, a tenant ID 702, a notification revision 703, and an administrator 1901. The administrator 1901 is information for performing management as to whether a target account is an administrator.

Figure 20:
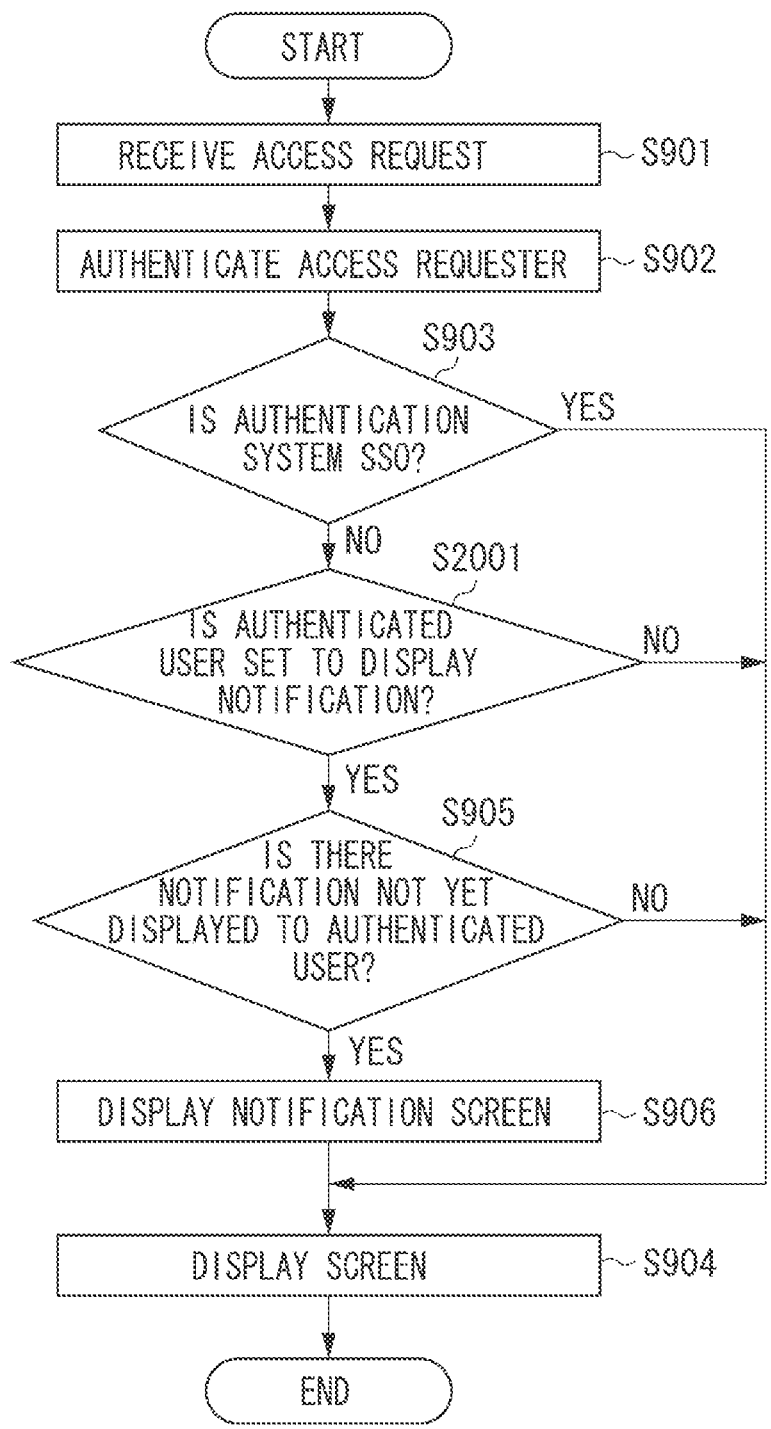
FIG. 20 is a flowchart illustrating a notification information display determination flow in units of users performed when a user has performed access.

FIG. 20 is a flowchart illustrating a notification information display determination flow performed when a service system 105 receives an access request in the present exemplary embodiment. Steps S901 to S903 are similar to those in the flow described in FIG. 9. In step S2001, the service system 105 determines whether a notification is set to be displayed to the authenticated user from the authority thereof. The service system 105 acquires a tenant ID to which the authenticated user belongs and information indicating whether the authenticated user is an administrator from the account table 1900. Then, the service system 105 determines whether the notification is set to be displayed to the authenticated user from the sales tenant table 1800 and the customer tenant table 1810. If the notification is set not to be displayed to the authenticated user (NO in step S2001), the service system does not display a notification screen, and the processing proceeds to step S904. In step S904, the service system 105 displays an access request destination screen. If the notification is set to be displayed to the authenticated user (YES in step S2001), the processing proceeds to step S905. In step S905 and the subsequent steps, the flow described in FIG. 9 is implemented.

In the method according to the fourth embodiment, control can be performed as to whether the notification information, which has not yet been displayed, is displayed to the user who has performed access using the method other than the SSO by the SAML according to the setting for each tenant and the authority of the user.

A fifth exemplary embodiment in which notification information is not forcedly displayed during authentication will be described below. In a service having a plurality of functions and having a plurality of screens in units of the functions, while a notification is displayed when any one of the services is used, the notification may not be required to be displayed only when the specific function of the service is used. When the service cooperates with another service, a notification may also be required not to be displayed when called from a specific cooperation destination or when called from a specific device. When notification information is accessed from a small screen such as a screen of a multifunction peripheral, the screen cannot accommodate the notification information. In the present exemplary embodiment, a system for determining whether the notification information is displayed in units of access destinations will be described in addition to an authentication system.

FIG. 21 illustrates a data structure of an exclusion URL to be managed by a service management server 104 in a table format. An exclusion URL table 2100 includes a URL 2101. The URL 2101 represents a URL to which a notification is not displayed when accessed. The URL 2101 may be only a part of the URL, e.g., a URL parameter.

Figure 22:
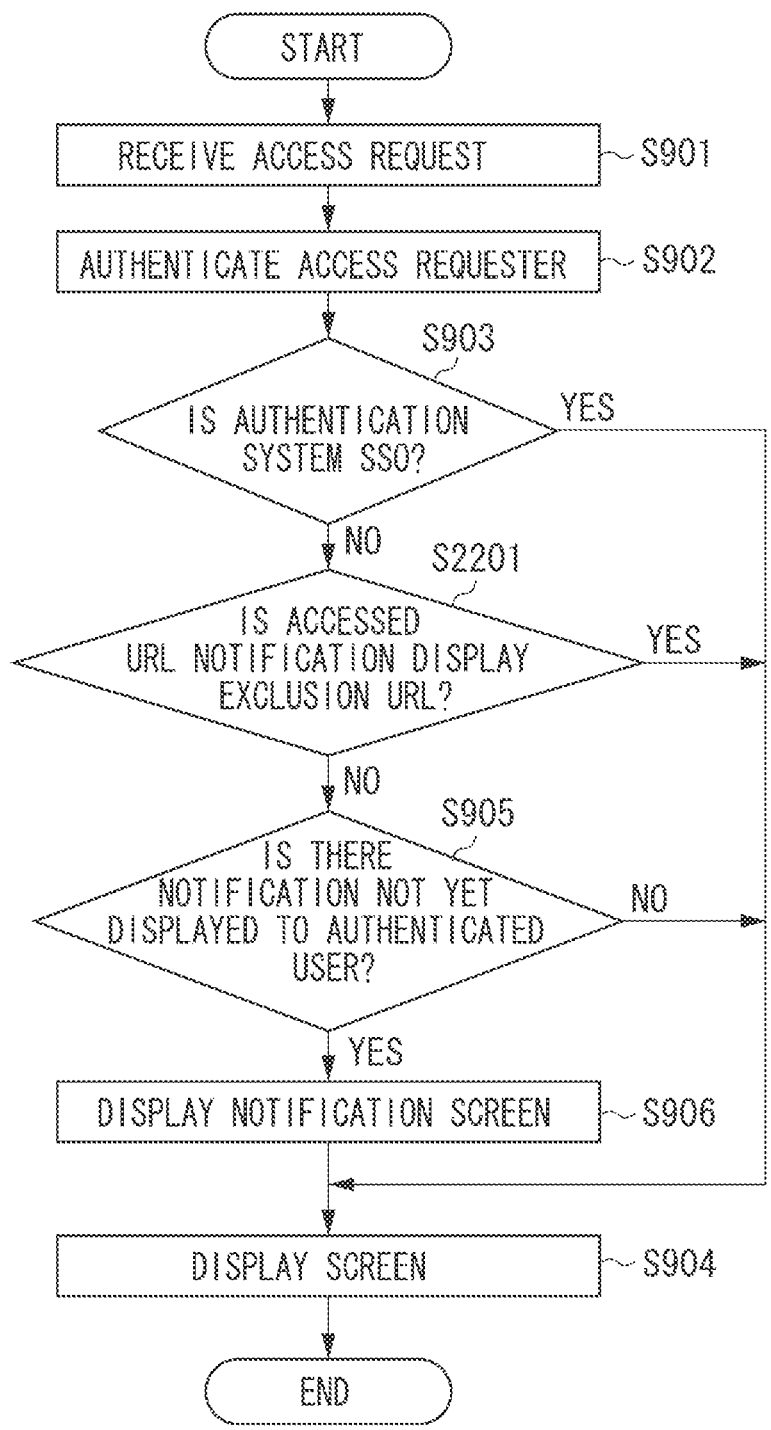
FIG. 22 is a flowchart illustrating a notification information display determination flow in units of URLs performed when a user has performed access.

FIG. 22 is a flowchart illustrating a notification information display determination flow performed when a service system 105 receives an access request in the present exemplary embodiment. Steps S901 to S903 are similar to those in the flow described in FIG. 9. In step S2201, the service system 105 determines whether an accessed URL is an exclusion URL, and confirms whether the accessed URL is included in the exclusion URL table 2100. If the accessed URL is included in the exclusion URL table 2100 (YES in step S2201), a notification is not displayed, and the processing proceeds to step S904. In step S904, the service system 105 displays an access request destination screen. If the accessed URL is not included in the exclusion URL table 2100 (NO in step S2201), the processing proceeds to step S905. In step S905 and the subsequent steps, the flow described in FIG. 9 is executed. The service system 105 is called by adding the URL parameter to an access destination URL when called from a specific device having a small screen, for example. The service system 105 confirms that the parameter is registered in the exclusion URL, and determines that the notification is not displayed.

In the method according to the fifth exemplary embodiment, control can be performed as to whether the notification information, which has not yet been displayed, is displayed to the user who has performed access using a method other than an SSO by an SAML depending on the access destination URL.

A sixth exemplary embodiment in which notification information is not forcedly displayed during authentication will be described below. When display of the notification information using authentication systems is managed, the notification information may be desired to be displayed only in the specific authentication system. When an SSO by an SAML is performed, for example, an SAML certificate issued by an IdP needs to be previously registered on the side of an SP. A plurality of service systems can performs single-sign-on cooperation by registering the SAML certificate. However, when the SAML certificate has been expired, the SSO by the SAML cannot be performed. Therefore, only information indicating that the SSO cannot be used may be required to be displayed to a user who has performed access using the SSO. In the present exemplary embodiment, a system for specially displaying notification information will be described for each of the authentication systems.

FIG. 23 illustrates a data structure of notification information to be managed by a service management server 104 in a table format. A notification information table 2300 includes a notification ID 801, a revision 802, a publication state date 803, a publication end date 804, an authentication system 2301, and a notification content 805. The authentication system 2301 performs management as to whether the notification is issued to the specific authentication system.

FIG. 24 illustrates a screen for registering notification information according to the present exemplary embodiment. A notification registration screen 2400 includes a service selection portion 2401, a publication state data input portion 2402, a publication end date input portion 2403, an authentication system selection portion 2404, a notification title input portion 2405, an information input portion 2406, a registration button 2407, and a registration cancel button 2408. The service selection portion 2401 is a selection portion for selecting a service corresponding to a notification to be registered. The service selection portion 2401 is not indispensable. No item may exist, or a blank column may be designated. The authentication system selection portion 2404 is a selection portion for selecting an authentication system corresponding to the notification to be registered, includes one or a plurality of options corresponding to the service system 105. The plurality of options can also be selected at one time.

Figure 25:
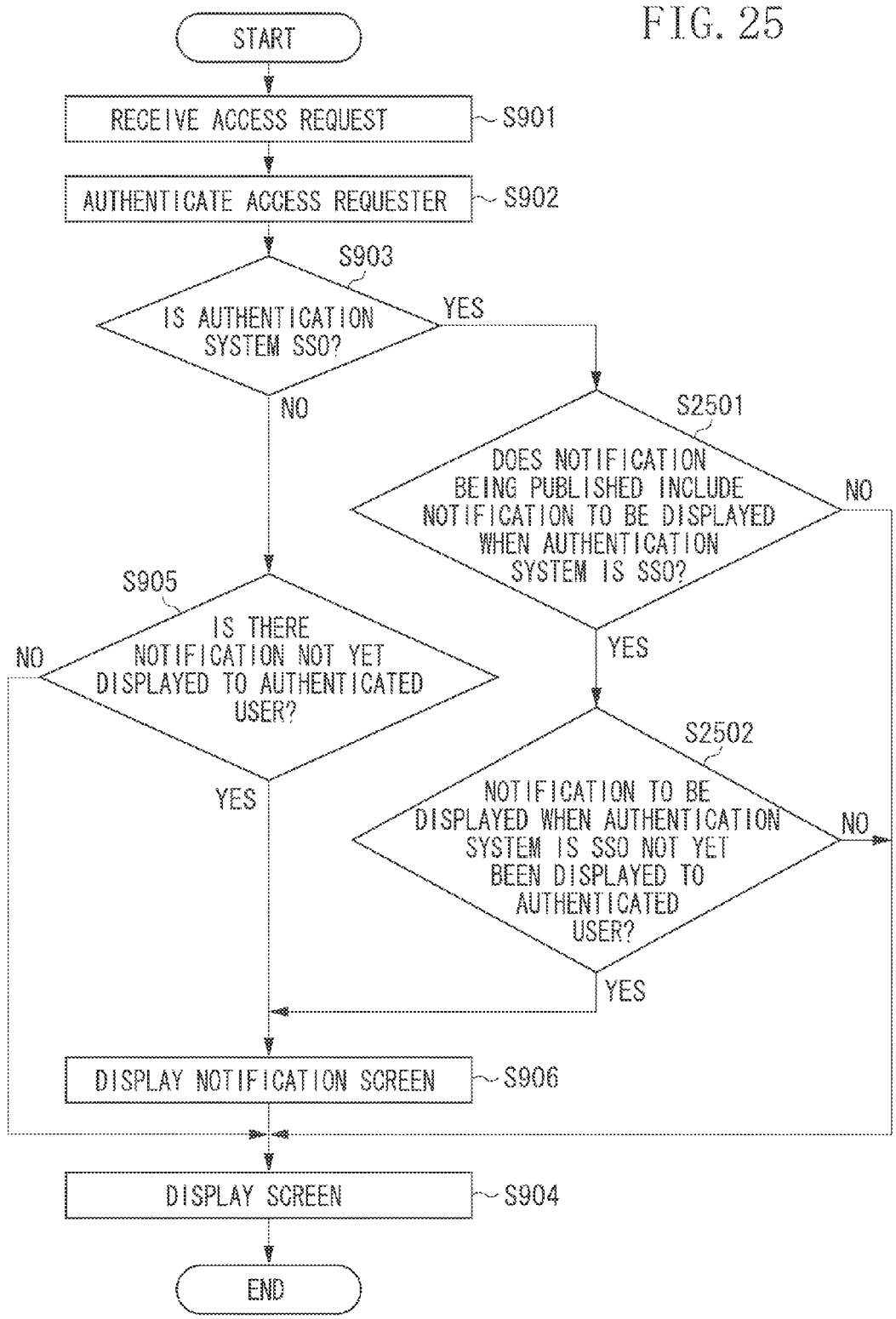
FIG. 25 is a flowchart illustrating a notification information display determination flow using an authentication system performed when a user has performed access.

FIG. 25 is a flowchart illustrating a notification information display determination performed when the service system 105 receives an access request in the present exemplary embodiment. Steps S901 to S906 are similar to those in the flow described in FIG. 9. In step S2501, the service system 105 determines whether notifications being published include a notification to be displayed when the authentication system is the SSO, and confirms whether the authentication system 2301 has been set for the notifications being published from the notification information table 2300. If there is no notification to be displayed when the authentication system is the SSO (NO in step S2501), the service system 105 does not display a notification, and the processing proceeds to step S904. In step S904, the service system 105 displays an access request destination screen. If there is a notification to be displayed when the authentication system is the SSO (YES in step S2501), the processing proceeds to step S2502. In this example, a user assigned a user ID "uid0000002" has performed access using the SSO on "October 10, 2013". Therefore, in the notification information table 2300, it is determined that notification revisions "1", "2", and "3" are being published. Further, it is determined that the notification revisions "1" and "3" are displayed when the authentication system is the SSO.

In step S2502, the service system 105 determines whether the notification being published to be displayed when the authentication system is the SSO has not yet been displayed to the authenticated user. If the notification to be displayed when the authentication system is the SSO has already been displayed (NO in step S2502), the service system 105 does not display the notification, and the processing proceeds to step S904. In step S904, the service system 105 displays an access request destination screen. If the notification being published to be displayed when the authentication system is the SSO has not yet been displayed (YES in step S2502), the processing proceeds to step S906. In step S906 and the subsequent steps, the flow described in FIG. 9 is executed. In this example, only the revision "1" is displayed to the user assigned the user ID "uid0000002". It is determined that the revisions "1" and "3" are displayed when the authentication system is the SSO from the notification information table 2300. The revision "1" has already been displayed to the user assigned the user ID "uid0000002" but the revision "3" has not yet been displayed thereto. Thus, the service system 105 determines that the notification is displayed, to display a notification screen. The notification to be displayed may be only the revision "3" serving as a SSO-related notification that has not yet been displayed, may be the revisions "1" and "3" serving as all SSO-related notifications, or may be the revisions "1", "2", and "3" serving as all notifications being published.

In the method according to the sixth exemplary embodiment, the notification information is not displayed to the user who has performed access using the SSO by the SAML but only the notification related to the SAML can be displayed thereto.

While the exemplary embodiments that are independently implemented have been described above, the exemplary embodiments can also be combined to implement the present invention. For example, after the determination processing in step S2501 and the subsequent steps illustrated in FIG. 25 is performed after it is determined that the answer is affirmative in step S903 illustrated in FIG. 15. Even if the authentication system is SSO authentication and SSO authentication processing is performed, a notification can be performed.

In each of the exemplary embodiments, description has been made based on the two authentication systems. More specifically, the first one is an authentication system for requesting a user to input authentication information and receiving the input authentication information, to perform authentication processing based on the authentication information. The second one is an authentication system for performing authentication processing based on an SAML response serving as authorization information issued as a result of authentication processing having been performed in the external authentication server 107 in which an SAML certificate has already been previously replaced and SSO cooperation has been determined without requesting the user to input authentication information in response to the authentication processing performed in the external authentication server 107 having successfully been performed, i.e., a single sign-on authentication system. However, the authentication system may not be these systems. Particularly, the latter authentication system need not be the SSO but may be a form for transferring authority of the user to another service, e.g., OAuth. In the OAuth, step S903 illustrated in FIG. 9 may be performed based on an OAuth token to be issued by permitting the user to transfer the authority. If it is determined that the authentication system is the OAuth, control is performed so that no notification is issued.

According to the present invention, when plurality of services cooperate with one another using such an authentication system that a part of authentication processing is omitted, including an SSO, each of the services can be inhibited from displaying notification information.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-216482 filed Oct. 17, 2013, which is hereby incorporated by reference herein in its entirety.

What is claimed is:

1. An authentication server system configured to perform authentication processing relating to use of a service, comprising:
a memory; and
one or more processors configured to act as an authentication unit, a notification unit, and a control unit, wherein
the authentication unit is configured to perform authentication processing using both a first authentication system that requests a user to input authentication information and receives the input authentication information, to perform authentication processing based on the authentication information, and a second authentication system that performs authentication processing without requesting the user to input authentication information and receives the authentication information in response to authentication processing performed in another authentication server system different from the authentication server system having successfully been performed;
the notification unit is configured to issue a notification associated with the service to a terminal operated by the user; and
the control unit is configured to perform control so that the notification unit issues the notification if the terminal is permitted to use the service as a result of the authentication unit having performed the authentication processing using the first authentication system, and configured to perform control so that the notification unit does not issue the notification if the terminal is permitted to use the service as a result of the authentication unit having performed the authentication processing using the second authentication system,
wherein the notification unit notifies, based on a table storing a notification period, a notification content, and an authentication system corresponding to the notification content in association with one another, the terminal of the notification content within the notification period, and
wherein the control unit performs, if the terminal is permitted to use the service as a result of the authentication processing having been performed using the first authentication system, control so that the notification unit issues the notification when the terminal is to be notified of the notification content within the notification period and the notification content corresponds to the first authentication system.

2. The authentication server system according to claim 1, wherein the authentication unit performs, when the authentication unit has received authorization information issued in response to the authentication processing performed in the other authentication server system having successfully been performed, the authentication processing using the second authentication system based on the authorization information, to permit the terminal to use the service.

3. The authentication server system according to claim 2, wherein the control unit performs control so that the notification unit does not issue the notification by acquiring a response to be transmitted to the terminal in response to the authentication unit having verified the authorization information and specifying that the authentication processing using the second authentication system has been performed from the response.

4. The authentication server system according to claim 1, wherein the control unit performs, if the terminal is permitted to use the service as a result of the authentication processing having been performed using the first authentication system, control so that the notification unit does not issue the notification when the notification unit is set not to issue the notification.

5. The authentication server system according to claim 1, wherein the one or more processors act as a provision unit, the provision unit configured to provide a notification registration screen including items for setting the notification period and the notification content and an item for setting whether the notification content corresponds to the first authentication system, and
wherein information set in the items included in the notification registration screen provided by the provision unit are stored in the table.

6. The authentication server system according to claim 1, wherein the second authentication system is a single sign-on authentication system.

7. A method for controlling an authentication server system configured to perform authentication processing relating to use of a service, comprising:
performing authentication processing using both a first authentication system for requesting a user to input authentication information and receiving the input authentication information, to perform authentication processing based on the authentication information and a second authentication system for performing authentication processing without requesting the user to input authentication information and receiving the authentication information in response to authentication processing performed in another authentication server system different from the authentication server system having successfully been performed;

notifying by issuing a notification associated with the service to a terminal operated by the user; and performing control so that the notifying issues the notification if the terminal is permitted to use the service as a result of the performing authentication processing having performed the authentication processing using the first authentication system, and performing control so that the notifying does not issue the notification if the terminal is permitted to use the service as a result of the performing authentication processing having performed the authentication processing using the second authentication system, wherein the notifying notifies, based on a table storing a notification period, a notification content, and an authentication system corresponding to the notification content in association with one another, the terminal of the notification content within the notification period, and wherein the performing control performs, if the terminal is permitted to use the service as a result of the authentication processing having been performed using the first authentication system, control so that the notifying issues the notification when the notification content of which the terminal is to be notified within the notification period and the notification content corresponds to the first authentication system.

8. The control method according to claim 7, wherein the performing authentication processing performs, when the received authorization information issued in response to the authentication processing performed in the other authentication server system having successfully been performed, the authentication processing using the second authentication system based on the authorization information, to permit the terminal to use the service.

9. The control method according to claim 8, wherein the performing control performs control so that the notifying does not issue the notification by acquiring a response to be transmitted to the terminal in response to the performing authentication processing having verified the authorization information and specifying that the authentication processing using the second authentication system has been performed from the response.

10. The control method according to claim 7, wherein the performing control performs, if the terminal is permitted to use the service as a result of the authentication processing having been performed using the first authentication system, control so that the notifying does not issue the notification when the notifying sets not to issue the notification.

11. The control method according to claim 7, further comprising providing a notification registration screen including items for setting the notification period and the notification content and an item for setting whether the notification content corresponds to the first authentication system, and wherein information set in the items included in the notification registration screen are stored in the table.

12. The control method according to claim 7, wherein the second authentication system is a single sign-on authentication system.

13. A non-transitory storage medium storing a program for causing a computer to perform a method for controlling an authentication server system configured to perform authentication processing relating to use of a service, comprising:

performing authentication processing using both a first authentication system for requesting a user to input authentication information and receiving the input authentication information, to perform authentication processing based on the authentication information and a second authentication system for performing authentication processing without requesting the user to input authentication information and receiving the authentication information in response to authentication processing performed in another authentication server system different from the authentication server system having successfully been performed;

notifying by issuing a notification associated with the service to a terminal operated by the user; and performing control so that the notifying issues the notification if the terminal is permitted to use the service as a result of the performing authentication processing having performed the authentication processing using the first authentication system, and performing control so that the notifying does not issue the notification if the terminal is permitted to use the service as a result of the performing authentication processing having performed the authentication processing using the second authentication system, wherein the notifying notifies, based on a table storing a notification period, a notification content, and an authentication system corresponding to the notification content in association with one another, the terminal of the notification content within the notification period, and wherein the performing control performs, if the terminal is permitted to use the service as a result of the authentication processing having been performed using the first authentication system, control so that the notifying issues the notification when the notification content of which the terminal is to be notified within the notification period and the notification content corresponds to the first authentication system.

* * * * *